United States Patent Office 2,727,073
Patented Dec. 13, 1955

2,727,073

PREPARATION OF DI-AROMATIC TRICHLORO-PHOSPHORANES BY THE CHLORINATION OF A PHOSPHINODITHIOIC ACID OR A PHOSPHINOTHIOIC CHLORIDE

Willis G. Craig, Willoughby, and William A. Higgins, Cleveland Heights, Ohio, assignors to The Lubrizol Corporation, Wickliffe, Ohio, a corporation of Ohio No Drawing. Application January 26, 1954,
Serial No. 406,328

6 Claims. (Cl. 260—607)

This invention relates to a novel method for preparing certain phosphorus- and chlorine-containing compounds. More particularly it is related to a halogenation process.

The products which result from the novel process described herein may be represented structurally by the following formula:

wherein Ar and Ar' may be the same or different aromatic radicals. Such compounds have been prepared in the past by the exhaustive chlorination of the corresponding chlorophosphine. Although such a chlorination results in a convenient and speedy reaction, the process suffers from the relative unavailability of chlorophosphines as a class.

It is accordingly a principal object of the present invention to provide a novel process for the preparation of di-aromatic trichlorophosphoranes. It is also an object of this invention to provide such a process which is not only convenient of operation, but which also is attractive because of its utilization of cheap and readily available starting materials.

Other objects will be apparent from the ensuing description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In accordance with the principles of this invention a novel process has been discovered which process results in the formation of di-aromatic trichlorophosphoranes. This process may be described broadly as the treatment of a compound selected from the class consisting of di-aromatic phosphinodithioic acids and di-aromatic phosphinothioic chlorides with chlorine and subsequent isolation of the corresponding di-aromatic trichlorophosphorane from said chlorination mass.

In a more particular sense the process may be described as the reaction of a phosphorus- and sulfur-containing compound indicated by the formula:

where Ar and Ar' are the same or different aromatic radicals bound to phosphorus through benzenoid carbon atoms, and A is selected from the class consisting of mercapto and chloro radicals; with chlorine in amounts sufficient to form trichlorophosphorane. The mercapto radical is represented structurally by —SH.

The radicals Ar and Ar' in the above formula may be any substituted or unsubstituted aromatic radical, including aryl radicals, and are illustrated by the following: radicals derived by abstraction of a hydrogen atom from a benzenoid carbon atom of benzene, toluene, o-, m-, or p-xylene, mesitylene, durene, cumene, ethylbenzene, pseudocumene, tert-butylbenzene, 2,4-di-tert-butylbenzene, tert-amylbenzene, di-tert-amylbenzene, octylbenzene, kerylbenzene, waxbenzene, chlorobenzene, o-dichlorobenzene, p-dichlorobenzene, trichlorobenzene, anisole, phenetole, etc.

The di-aromatic phosphinodithioic acids may be represented by the structural formula shown below:

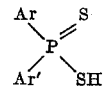

where Ar and Ar' are the same or different aromatic radicals as defined above. Such acids are readily available from the process described and illustrated in copending application Serial No. 406,323, filed January 26, 1954. By means of this process, aromatic compounds are converted to corresponding di-aromatic phosphinodithioic acids by reaction with phosphorus pentasulfide in the presence of aluminum halide.

The di-aromatic phosphinothioic chlorides may be represented by the structural formula shown below:

where Ar and Ar' are the same or different aromatic radicals as defined above. The preparation of such compounds may be accomplished either by sulfurization of the corresponding di-aromatic monochlorophosphine with sulfur or thiophosphoryl chloride, by a Friedel-Crafts reaction of an aromatic compound with thiophosphoryl chloride in the presence of aluminum chloride, or, as disclosed in copending application Serial No. 406,326, filed January 26, 1954, by reaction of a di-aromatic phosphinodithioic acid with hydrogen chloride.

The process is carried out at approximately room temperature. Temperatures within the range of 0–100° C. are preferred, although lower or higher temperatures may be employed in particular instances. The chlorination reaction is exothermic and the reaction mass must be cooled, if it is desired to maintain a constant temperature. A constant temperature is not essential, however, for the success of the process.

The progress of the reaction in most cases can be ascertained by the observance of solid formation in the reaction mass. This solid is the di-aromatic trichlorophosphorane and in most instances the reaction is considered complete when a maximum amount of such solid has formed.

The solid product may be removed from the mixture by filtration, centrifugation, etc. It may be purified by washing with an inert solvent, such as, benzene, carbon tetrachloride, carbon disulfide, etc.

Although the exact mechanism by which the reaction proceeds is not known, it is known that in the case of the chlorination of di-aromatic phosphinodithioic acid, an intermediate product of the following composition is first formed:

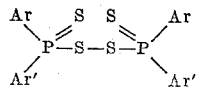

Further chlorination of this intermediate material results in the di-aromatic trichlorophosphorane.

The relative amounts of reagents employed depends on whether the starting material is phosphinodithioic acid or phosphinothioic chloride. For example, if the equations below are correct for the reactions, then in the first case, the stoichiometry of the reaction requires at least six equivalents of chlorine per equivalent of phosphinodithioic acid, while in the second case, three equivalents of chlorine are required.

(1) $Ar_2PSSH + 3Cl_2 \rightarrow Ar_2PCl_3 + S_2Cl_2 + HCl$
(2) $2Ar_2PSCl + 3Cl_2 \rightarrow 2Ar_2PCl_3 + S_2Cl_2$ It is apparent that exhaustive chlorination of either reaction mixture will result in the conversion of the sulfur monochloride to sulfur dichloride, and likewise that if the same reaction mixtures are treated with less than the above-indicated quantities of chlorine the by-product may be free sulfur. In either case, the stoichiometry of the reaction requires at least two equivalents of chlorine per equivalent of organic phosphino compound starting material.

The use of an inert solvent is preferred inasmuch as the reaction mixture is thereby made more fluid and better contact between reactants is afforded. Such solvents as low boiling petroleum fractions, chlorinated hydrocarbons, such as chloroform, trichloroethylene, and carbon tetrachloride, benzene, toluene, ethyl ether, etc. are satisfactory. Of these, carbon tetrachloride and benzene have been found to be particularly useful and they are preferred.

The following examples will further illustrate the invention.

*Example 1*

A solution of 631 grams (2.58 moles) of diphenylphosphinothioic chloride in one liter of benzene was placed in a water bath and chlorine was passed in throughout a 2.5 hour period. The temperature was maintained at 40–50° C. The product mixture was freed of unchanged chlorine by flushing with nitrogen for 10 minutes, and then was filtered. The solid was washed with benzene and the resulting white solid, which weighed 718 grams, was collected as diphenyltrichlorophosphorane.

*Example 2*

Chlorine was bubbled into a solution of 2100 grams (8.35 moles) of diphenylphosphinothioic chloride in two liters of benzene, maintained at a temperature of 45–50° C. for 1.5 hours. The resulting solid was filtered and washed several times with naphtha, then with benzene. The resulting white solid was identified as diphenyltrichlorophosphorane by conversion with sulfur dioxide to diphenyl phosphinic chloride which in turn was identified by elementary analyses:

| | Per cent |
|---|---|
| Phosphorus | 12.5 |
| Sulfur | Trace |
| Chlorine | 15.5 |

*Example 3*

Chlorine was bubbled into a stirred solution of 1325 grams of diphenylphosphinodithioic acid in 600 ml. of benzene, maintained at 45–50° C., for six hours. Excess chlorine was removed by means of reduced pressure maintained for two hours. The solid was collected on a filter and the filtrate was subjected to reduced pressure whereupon an additional quantity of solid was obtained. The two portions of solid were combined, washed with naphtha and dried. The white solid, diphenyl trichlorophosphorane, weighed 1450 grams.

*Example 4*

A well-stirred solution of 2060 grams of diphenylphosphinodithioic acid in 2500 grams of carbon tetrachloride was placed in an ice bath and treated over a period of two hours with a stream of dry chlorine. The temperature of the exothermic reaction mixture was maintained below 30° C. The resulting slurry was filtered and the solid was washed twice with a carbon tetrachloride-carbon disulfide solvent mixture. The solid was dried; weight: 2400 grams. It was substantially pure diphenyl trichlorophosphorane as shown by the following analyses:

| | Per cent |
|---|---|
| Chlorine | 39.4 |
| Sulfur | 0.4 |

*Example 5*

A solution of 700 grams (2.1 moles) of di-(chlorophenyl) phosphinothioic chloride in 500 ml. of benzene and 2000 ml. of naphtha was treated with a stream of chlorine at 40–60° C. for four hours. This chlorination product was allowed to cool, filtered, and the solid washed with naphtha and petroleum ether. The dried white solid weighed 735 grams and was identified as the di-(chlorophenyl) trichlorophosphorane by reaction with sulfur dioxide and subsequent characterization of this product as di-(chlorophenyl) phosphinic chloride by elementary analyses:

| | Per cent |
|---|---|
| Phosphorus | 9.9 |
| Chlorine | 34.5 |

The di-aromatic trichlorophosphoranes are useful as starting materials for the preparation of other chemical compounds. They can also be employed in lubricating oils and greases as extreme pressure agents, oxidation inhibitors, etc. Other suitable uses are in asphalt emulsions, insecticidal compositions, fireproofing and stabilizing agents in plasticizers and plastics, paint driers, rust inhibiting compositions, pesticides, foaming compositions, cutting oil, metal drawing compositions, tanning assistants, metal cleaning compositions, emulsifying agents, antiseptic cleansing compositions, penetrating agents, gum solvent compositions, fat splitting agents, flotation agents, improving agents for hydrocarbon fuels, etc.

Other modes of applying the principle of the invention may be employed, change being made as regards the details described, provided the features stated in any of the following claims, or the equivalent of such, be employed.

We therefore particularly point out and distinctly claim as our invention:

1. A method for the preparation of di-aromatic trichlorophosphoranes which comprises reacting a compound of the formula:

wherein R and R' are selected from the class consisting of the same and different aromatic radicals each attached to phosphorus through a benzenoid carbon atom and A selected from the class consisting of mercapto and chloro groups; with sufficient chlorine to form the trichlorophosphorane.

2. The method of claim 1 further characterized in that A is a mercapto group.

3. The method of claim 1 further characterized in that A is a chloro group.

4. The method of claim 1 further characterized in that R and R' are selected from the class consisting of the same and different aromatic hydrocarbon radicals.

5. The method of claim 1 further characterized in that R and R' are selected from the class consisting of the same and different aryl radicals.

6. The method of claim 1 further characterized in that R and R' are phenyl radicals.

References Cited in the file of this patent

Kosolapoff: Organophosphorus Compounds (Wiley), 1950, pp. 58 and 59.